United States Patent
Yang et al.

(10) Patent No.: US 11,172,349 B2
(45) Date of Patent: Nov. 9, 2021

(54) EFFICIENT FILE IDENTIFIERS (FIDS) AND SHORT FILE IDENTIFIERS (SFIS) UNDER UNIVERSAL SUBSCRIBER IDENTITY MODULE (USIM) APPLICATION DEDICATED FILE (ADF)

(71) Applicant: MEDIATEK INC., Hsin-Chu (TW)

(72) Inventors: Yi Lun Yang, Hsin-Chu (TW); Marko Niemi, Oulu (FI)

(73) Assignee: MediaTek INC., Hsin-Chu (TW)

( * ) Notice: Subject to any disclaimer, the term of this patent is extended or adjusted under 35 U.S.C. 154(b) by 0 days.

(21) Appl. No.: 16/503,736

(22) Filed: Jul. 5, 2019

(65) Prior Publication Data

US 2020/0396590 A1 Dec. 17, 2020

Related U.S. Application Data

(60) Provisional application No. 62/694,153, filed on Jul. 5, 2018.

(51) Int. Cl.
*H04W 8/18* (2009.01)
*H04W 12/06* (2021.01)
*H04W 12/08* (2021.01)

(52) U.S. Cl.
CPC .......... *H04W 8/183* (2013.01); *H04W 12/06* (2013.01); *H04W 12/08* (2013.01)

(58) Field of Classification Search
CPC ......... H04W 8/18; H04W 8/183; H04W 8/20; H04W 12/02; H04W 12/06;
(Continued)

(56) References Cited

U.S. PATENT DOCUMENTS

| 2015/0350878 A1* | 12/2015 | Li .......................... H04W 8/20 455/558 |
| 2016/0087957 A1 | 3/2016 | Shah et al. ........................ 726/1 |
| 2016/0302070 A1 | 10/2016 | Yang et al. .................... 713/155 |

FOREIGN PATENT DOCUMENTS

| CN | 101520854 A | 2/2009 |
| CN | 101583204 A | 6/2009 |

(Continued)

OTHER PUBLICATIONS

International Search Report and Written Opinion of International Search Authority for PCT/CN2019/094896 dated Oct. 10, 2019 (8 pages).

(Continued)

*Primary Examiner* — Ankur Jain
(74) *Attorney, Agent, or Firm* — Imperium Patent Works; Zheng Jin; Helen Mao (57) ABSTRACT

Methods and apparatus are provided for efficiently operating of USIM FIDs and SFIs under USIM ADF. In one novel aspect, the UICC of the mobile equipment comprises one or more generation dedicated files (DFs), and one or more generation-dedicated elementary files (EFs) are stored in each corresponding generation DF. In one embodiment, at least one of the generation-dedicated EFs is assigned an SFI. In another embodiment, each generation-dedicated EFs is assigned an SFI. In yet another embodiment, all generation-dedicated EFs for one generation are stored in corresponding generation DF. In one embodiment, at least one of the 5GS EFs is associated with at least one of: 5GS 3GPP location information, 5GS non-3GPP location information, 5GS 3GPP Access NAS Security Context, non-5GS 3GPP Access NAS Security Context, and 5G authentication keys.

18 Claims, 5 Drawing Sheets

(58) Field of Classification Search
CPC ......... H04W 12/0806; H04W 12/0023; H04W 4/50; H04W 12/08; H04W 12/40
See application file for complete search history.

(56) References Cited

FOREIGN PATENT DOCUMENTS

| TW | 201541977 A | 4/2013 |
|---|---|---|
| TW | 201728193 A | 1/2016 |
| WO | WO2012054030 A1 | 10/2010 |

OTHER PUBLICATIONS

3GPP TS 31.102 V15.1.0 (Jun. 2018), 3rd Generation Partnership Project; Technical Specification Group Core Network and Terminals; Characteristics of the Universal Subscriber Identity Module (USIM) application (Release 15) *p. 121 paragraphs 6 to p. 126 paragraphs 1, p. 211 paragraphs 1 to p. 216 paragraphs 6.

Taiwan IPO, office action for related TW patent application 108123760 (no English translation is available) dated Jan. 7, 2021 (7 pages).

3GPP TS 31.102 V15.1.0 (Jun. 2018), 3rd Generation Partnership Project; Technical Specification Group Core Network and Terminals; Characteristics of the Universal Subscriber Identity Module (USIM) application (Release 15) *p. 121-123 sections 4.2.113-4.2.114*, *p. 135-136 section 4.4.2.1*.

Taiwan IP Office prepared Written Opinion and search report for related application 108123760 dated Aug. 5, 2021 (4 pages).

3GPP TS 31.102, 3GPP Organization, Jun. 30, 2018 (Jun. 30, 2018).

* cited by examiner

EFFICIENT FILE IDENTIFIERS (FIDS) AND SHORT FILE IDENTIFIERS (SFIS) UNDER UNIVERSAL SUBSCRIBER IDENTITY MODULE (USIM) APPLICATION DEDICATED FILE (ADF)

CROSS REFERENCE TO RELATED APPLICATIONS

This application claims the benefit under 35 U.S.C. § 119 from U.S. provisional application Ser. No. 62/694,153, entitled "Solve Insufficiency of FIDs and SFIs under USIM ADF," filed on Jul. 5, 2018, the subject matter of which is incorporated herein by reference.

TECHNICAL FIELD

The disclosed embodiments relate generally to wireless communications, and, more particularly, to efficient FIDs and SFIs under USIM application dedicated file.

BACKGROUND

A Universal Integrated Circuit Card (UICC) or a Subscriber Identity Module (SIM) card is used mostly in cellular phones that for the Mobile Communications Network. There are many applications in the UICC, such as a universal SIM (USIM) application and a CDMA SIM (CSIM) application. The USIM application brought security improvements like the mutual authentication and longer encryption keys and an improved address book. The USIM application is structured with USIM application dedicated file (ADF), including multiple element files (EFs). The ADF is allowed to own 256 EFs, each of which is identified by a file identifier (FID). A short file ID (SFI) is a special FID. Under USIM ADF, the mobile equipment (ME) can use SFI to reduce the times of hardware access and improve the efficiency of the USIM operation. Each DF is allowed to own 30 SFIs. And the current USIM ADF has run out of 30 SFIs.

For backward compatibility, the existing files keep their existing structure. The next generation fifth-generation system (5GS) will have new files stored in the USIM ADF; however, the current USIM ADF has run out of thirty short file identifiers (SFIs). Therefore, none of the 5GS files can have SFI assigned. The access of the 5GS files will be less efficient. Further, future generation SIM files face the same problem as for the 5GS.

Improvements are needed for efficient FIDs and SFIs for the 5GS and future generation mobile devices.

SUMMARY

Methods and apparatus are provided for efficiently operating of USIM FIDs and SFIs under USIM ADF. In one novel aspect, the UICC of the mobile equipment comprises one or more generation dedicated files (DFs), and one or more generation-dedicated elementary files (EFs) are stored in each corresponding generation DF. In one embodiment, the mobile equipment generates a UICC command, wherein a UICC of the mobile equipment comprises one or more generation DFs, and wherein one or more generation-dedicated EFs are stored in each corresponding generation DF, and performs the UICC command on a target EF, wherein the target EF is a generation-dedicated EF. In another embodiment, the UICC command is one selecting from the SELECT command, the READ command, and the UPDATE command. In yet another embodiment, the generation DFs includes a 5GSDF, where one or more 5GS EFs are stored in the 5GS DF. In other embodiment, at least one of the 5GS EFs is associated with an element in a 5GS group comprising: 5GS 3GPP location information, 5GS non-3GPP location information, 5GS 3GPP Access NAS Security Context, non-5GS 3GPP Access NAS Security Context, and 5G authentication keys. In one embodiment, at least one of the generation-dedicated EFs is assigned an SFI. In another embodiment, wherein each generation-dedicated EFs is assigned an SFI. In yet another embodiment, all generation-dedicated EFs for one generation are stored in corresponding generation DF.

In one embodiment, one or more new dedicated file (DF) are created under the USIM ADF for new EFs after 5GS. In one embodiment, one or more new DFs are created for the future generation beyond 5GS, such as 6G, EFs. In another embodiment, the mobile equipment (ME)/user equipment (UE) accesses the new EFs under the new DF for new generations with SFI assigned. In one embodiment, the UE enables fifth-generation system (5GS) operations for a UICC, wherein the UICC includes backwards compatible operation files stored in a USIM ADF, assigns 5GS address spaces on the UICC, wherein the 5GS address spaces comprise a 5GS file area for a plurality of 5GS elementary files (EFs) that are only used for 5GS operations, and creates a 5GS dedicated file (DF) in the 5GS file area, wherein the 5GS EFs are assigned in the 5GS DF. In one embodiment, the 5GS DF is a child directory of the USIM ADF. In another embodiment, the UE further assigns short file identifiers (SFIs) to each 5GS EFs in the 5GS DF. In one embodiment, the non-dedicated 5GS EFs are stored under the USIM ADF. In another embodiment, the non-dedicated 5GS EFs are stored under the 5GS DF without SFI. In one embodiment, short file identifiers (SFIs) to dedicated 5GS EFs in the 5GS DF, wherein all 5GS EFs are assigned in the 5GS DF. In yet another embodiment, the UE creates a new DF for each future generation of wireless standard, such as 6G, wherein each DF contains EFs dedicated to their corresponding generation of wireless standard. In one embodiment, one or more EFs that are shared in 5GS and future generation of wireless standard, such as 6G, EFs are stored in the USIM ADF.

In one embodiment, the UE executes a UICC command, selects a 5GS DF when the target elementary file (EF) is a 5GS dedicated file, wherein the 5GS DF is a child directory of a USIM ADF, and performs the UICC command using a corresponding short file identifier (SFI), wherein each dedicated 5GS file in the 5GS DF is assigned a corresponding SFI. In one embodiment, 5GS DF includes only 5GS EFs, wherein non-dedicated 5GS EFs are assigned in the USIM ADF. In another embodiment, all 5GS EFs are included in the 5GS DF.

In another novel aspect, one or more generation DFs are created for a UICC, and one or more generation-dedicated EFs are created, wherein the one or more generation-dedicated EFs are stored in each corresponding generation DF.

Other embodiments and advantages are described in the detailed description below. This summary does not purport to define the invention. The invention is defined by the claims.

DETAILED DESCRIPTION

Reference will now be made in detail to some embodiments of the invention, examples of which are illustrated in the accompanying drawings.

Figure 1:
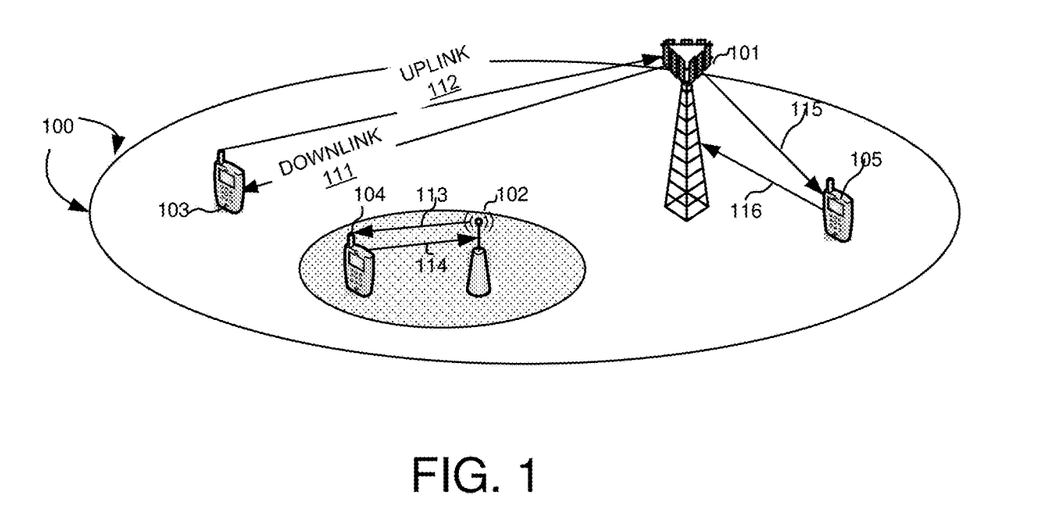
FIG. 1 illustrates an exemplary wireless communication network 100 with UEs supporting 5G features with efficient FIDs and SFIs in USIM ADF in accordance with embodiments of the current invention.

FIG. 1 illustrates an exemplary wireless communication network 100 with UEs supporting 5G features with efficient FIDs and SFIs in USIM ADF in accordance with embodiments of the current invention. Wireless communication system 100 includes one or more fixed base infrastructure units forming a network distributed over a geographical region. The base unit may also be referred to as an access point, an access terminal, a base station, a Node-B, an eNode-B (eNB), a gNB, or by other terminology used in the art. In FIG. 1, the one or more base stations 101 and 102 serve a number of remote units/user equipment (UEs) 103, 104, and 105 within a serving area, for example, a cell, or within a cell sector. In some systems, one or more base stations are communicably coupled to a controller forming an access network that is communicably coupled to one or more core networks. The disclosure, however, is not intended to be limited to any particular wireless communication system.

Generally, serving base stations 101 and 102 transmit downlink communication signals 111 and 113 to UEs or mobile stations in the time and/or frequency domain. UEs or mobile stations 103 and 104 communicate with one or more base stations 101 and 102 via uplink communication signals 112, 114, and 116. UE or the mobile station may also be referred to as a mobile phone, laptop, and mobile workstation and so on. In FIG. 1, the mobile communication network 100 is an OFDM/OFDMA system comprising a base station eNB 101 eNB 102 and a plurality of UE 103, UE 104, and UE 105. When there is a downlink packet to be sent from the eNB to the UE, each UE gets a downlink assignment, e.g., a set of radio resources in a physical downlink shared channel (PDSCH). When a UE needs to send a packet to eNB in the uplink, the UE gets a grant from the eNB that assigns a physical uplink shared channel (PUSCH) consisting of a set of uplink radio resources. The UE can also get grant-free uplink access on PUSCH. The UE gets the downlink or uplink scheduling information from a new RAT physical downlink control channel (NR-PDCCH), which is targeted specifically to NR UEs/mobile stations and has similar functionalities as legacy PDCCH, EPDCCH and MPDCCH. The downlink or uplink scheduling information and the other control information, carried by NR-PDCCH, is referred to as downlink control information (DCI).

Figure 2:
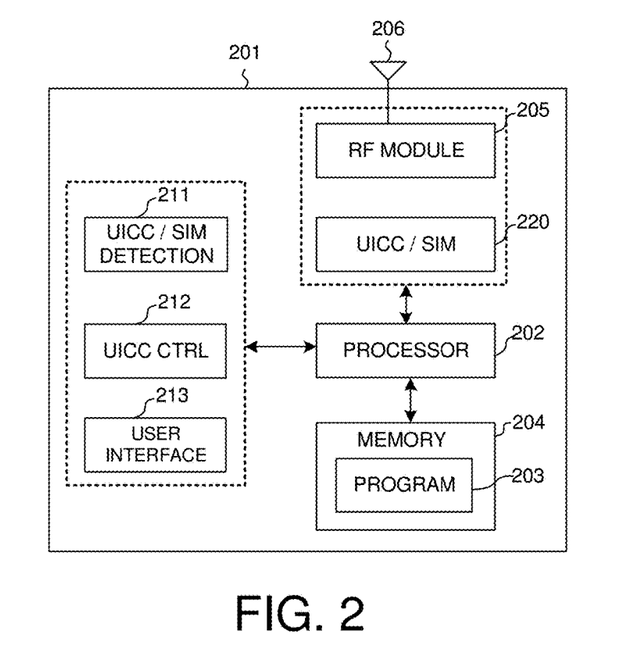
FIG. 2 is a simplified block diagram of a UE 201 carrying out certain embodiments of the present invention in accordance with embodiments of the current invention.

FIG. 2 is a simplified block diagram of a UE 201 carrying out certain embodiments of the present invention in accordance with embodiments of the current invention. UE 201 comprises RF module 205, coupled with antenna 206, receives RF signals from antenna 206, converts them to baseband signals, and sends them to processor 202. RF module 205 also converts received baseband signals from processor 202, converts them to RF signals, and sends out to antenna 206. Processor 202 processes the received baseband signals and invokes different functional modules to perform features in the UE. Memory 203 stores program instructions and data 204 to control the operations of the UE. UE 201 comprises a UICC 220. UICC 220 stores existing generation, such as USIM application files. In one novel aspect, UE access 5GS files with new structures such that the access is backward compatible and efficient.

FIG. 2 further illustrates three functional modules 211 to 213 in the UE that carry out embodiments of the present invention. The functional modules may be implemented and configured by hardware, firmware, software, and any combination thereof. UICC/SIM detection module 211 detects the UICC type and status. UICC Control 212 sends notifications and requests to the operator UICC replacement and/or update. User Interface 213 provides one or more menu for the user to select UICC replacement/update options.

Figure 3:
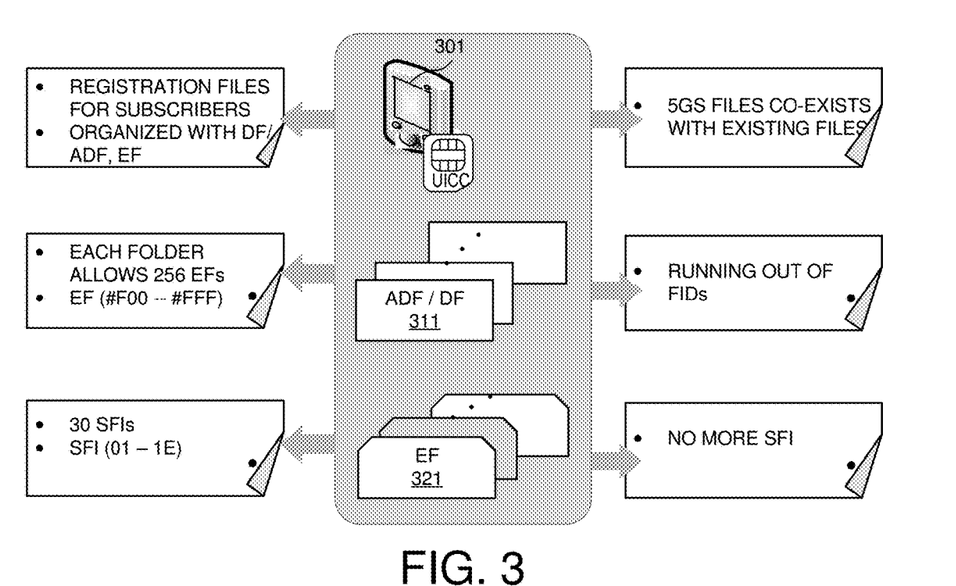
FIG. 3 illustrates exemplary diagrams for UICC structure with new 5GS files EFs in accordance with embodiments of the current invention.

FIG. 3 illustrates exemplary diagrams for UICC structure with new 5GS files EFs in accordance with embodiments of the current invention. A UE 301 with a UICC stores subscriber information. The UICC is the platform for the 5G mobile device to secure 5G network access in accordance with the 5G standards. New 5G files are needed to store in the UICC. UICC is structured with USIM application DF (ADF), including multiple dedicated files (DFs) and element files (EFs). Each DF is allowed to own 256 EFs, each of which is identified by a file identifier (FID) ranging from #F00 to #FFF. A short file ID (SFI) is a special FID. Under USIM ADF or a specific DF, the mobile equipment (ME) can bring SFI in READ/WRITE APDU command without SELECT to the target file. The use of SFI reduces the times of hardware access and improves the efficiency of the USIM operation. In prior development, new EFs for UMTS and LTE are placed under USIM ADF level. Currently, there are 110 EFs and all the 30 SFIs under USIM ADF are being used. With the development of the new generation 5GS, the FIDs are running out. Further, SFIs are not available for new EFs resulting in inefficient APDU performance.

Figure 4:
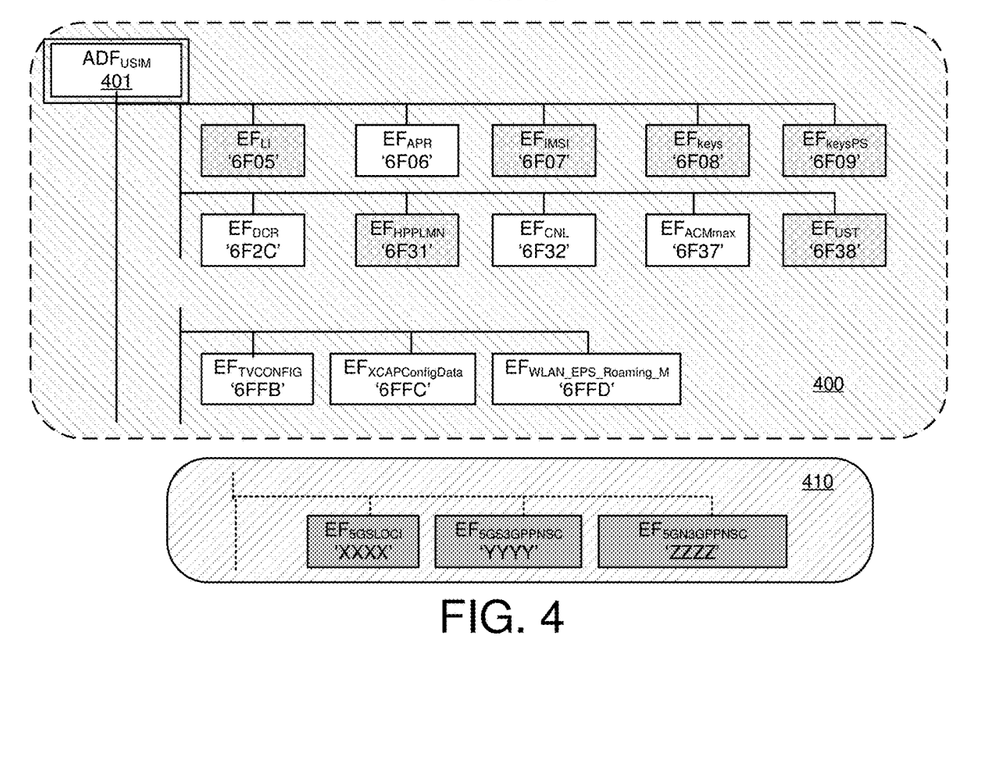
FIG. 4 illustrates an exemplary diagram for the FIDs and SFIs design under the USIM ADF to improve the efficiency for the 5GS in accordance with embodiments of the current invention.

In one novel aspect, a new generation DF is created under the USIM ADF. The new DF, namely the $DF_{5GS}$, is used to store 5GS EFs. In one embodiment, all the new 5GS EFs, including dedicated and non-dedicated 5GS files are stored under the newly created $DF_{5GS}$. Further, other non-5GS dedicated EFs. Under the standard, there are thirty EFs are assigned with SFIs. Currently, all thirty SFIs are used under $ADF_{USIM}$ 401. The current SFI values at the USIM ADF level are shown in Table 1.

TABLE 1

List of SFI Values at the USIM ADF Level

| File Identification | SFI | Description |
|---|---|---|
| '6FB7' | '01' | Emergency call codes |
| '6F05' | '02' | Language indication |
| '6FAD' | '03' | Administrative data |
| '6F38' | '04' | USIM service table |
| '6F56' | '05' | Enabled services table |
| '6F78' | '06' | Access control class |
| '6F07' | '07' | IMSI |
| '6F08' | '08' | Ciphering and integrity keys |
| '6F09' | '09' | Ciphering and integrity keys for packet switched domain |
| '6F60' | '0A' | User PLMN selector |
| '6F7E' | '0B' | Location information |
| '6F73' | '0C' | Packet switched location information |
| '6F7B' | '0D' | Forbidden PLMNs |
| '6F48' | '0E' | CBMID |
| '6F5B' | '0F' | Hyperframe number |
| '6F5C' | '10' | Maximum value of hyperframe number |
| '6F61' | '11' | Operator PLMN selector |
| '6F31' | '12' | Higher Priority PLMN search period |
| '6F62' | '13' | Preferred HPLMN access technology |
| '6F80' | '14' | Incoming call information |
| '6F81' | '15' | Outgoing call information |
| '6F4F' | '16' | Capability configuration parameters 2 |
| '6F06' | '17' | Access Rule Reference |
| '6FC5' | '19' | PLMN Network Name |
| '6FC6' | '1A' | Operator Network List |
| '6FCD' | '1B' | Service Provider Display Information |
| '6F39' | '1C' | Accumulated Call Meter (see note) |
| '6FD9' | '1D' | Equivalent HPLMN |
| '6FE3' | '1E' | EPS location information |
| '6FE4' | '18' | EPS NAS Security Context |

NOTE:
When used the value '1C' shall be used as SFI for EFACM, for compatibility reasons the terminal shall accept other values.

FIG. 4 illustrates an exemplary diagram for the FIDs and SFIs design under the USIM ADF to improve the efficiency for the 5GS in accordance with embodiments of the current invention. As the structure 400 shown, the current $ADF_{USIM}$ is running out of FIDs. There is no more SFIs available under $ADF_{USIM}$. 5GS USIM EFs 410 includes a portion of 5GS USIM files to be added to the USIM ADF. Under the existing USIM structure, these EFs, such as $EF_{5GSLOCI}$, $EF_{5GS3GPPNSC}$, and $EF_{5GN3GPPNSC}$, are assigned FIDs directly under $ADF_{USIM}$ with the unused FIDs, such as '6FFF', '6F00' and '6F01'. If the new EFs are structure under the existing structure, none of the 5GS or other new EFs files can be assigned with SFI. The SFI allows the ME to bring SFI in READ/WRITE APDU command without SELECT to the target file EF. SFI access reduces hardware access time and improves efficiency. Without the SFI available to the new 5GS EFs, reduces the efficiency of the USIM access for the 5GS mobile devices. Further, the existing FIDs are also running out under $ADF_{USIM}$. Therefore, putting 410 5GS EFs under $ADF_{USIM}$ does not provide efficient operation for 5GS users. EFs in 410 needs to have a new structure to improve efficiency.

Figure 5A:
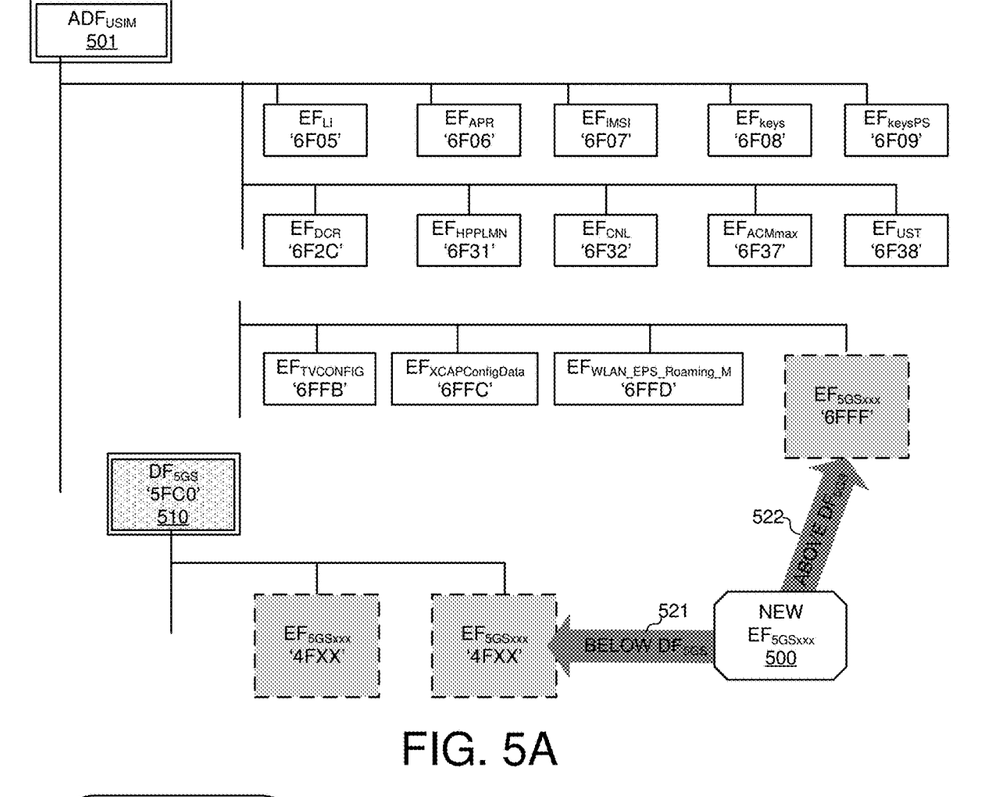
FIG. 5A illustrates exemplary diagrams for the new generation-dedicated EF files under USIM ADF in accordance with embodiments of the current invention.

FIG. 5A illustrates exemplary diagrams for the new EF files under USIM ADF in accordance with embodiments of the current invention. $ADF_{USIM}$ 501 includes the existing EFs for the current system. Multiple new EF files for 5GS, $EF_5GSxxx$ 500 are added to the $ADF_{USIM}$ 501. Since the new network system is named 5GS (5G System), UICC should create a new generation DF, named $DF_5GS$ 510. These EFs are stored under the newly created $DF_5GS$ 510. Thirty SFIs are available for $DF_5GS$ 510. The new EFs for 5G, and/or other generation systems, can use SFIs for more efficient UICC operation. In one embodiment, dedicated 5GS EFs are added to $DF_5GS$ 510 with SFI values. Other new EFs added for 5G but not necessarily need own SFI (such as $EF_{EARFCNList}$ or $EF_{SUCI\_Calc\_Info}$), can be stored at USIM ADF level as usual. In one embodiment, these new EFs not necessarily need own SFI are called non-dedicated EFs. In another embodiment, the EFs that are used by more than one wireless standard or multi-generations are non-dedicated EFs. Alternatively, the non-dedicated EFs can be added under $DF_5GS$ 510 without SFI.

In one novel aspect, new DF, $DF_5GS$ 510 is created under $ADF_{USIM}$ 501. New $EF_5GSxxx$ 500 are needed under the $ADF_{USIM}$ 501. In one embodiment 521, the New $EF_5GSxxx$ 500 is below $DF_5GS$ 510. For example, $EF_{5GSxxx}$ added under $DF_5GS$ 510 are assigned FIDs with '4Fxx'. The EFs under $DF_5GS$ 510 can be assigned with SFI available. In one embodiment, all the files under $DF_5GS$ 510 are dedicated files with SFIs. In another embodiment, only the dedicated EFs under $DF_5GS$ 510 are assigned with SFI. Other non-dedicated EFs, such as $EF_{EARFCNList}$ or $EF_{SUCI\_Calc\_Info}$ are stored under $DF_5GS$ 510 without SFI.

In another embodiment, the New $EF_{5GSxxx}$ 500 is at above the level of $DF_5GS$ 510. For example, $EF_{5GSxxx}$ is added above $DF_5GS$ 510 and directly under $ADF_{USIM}$ 501. These EFs are assigned FIDs still available, such as '6FFF'. Since there is no more SFI available under $ADF_{USIM}$ 501, these files are not assigned with SFIs. It is desirable to only put the non-dedicated EFs files under $ADF_{USIM}$ 501 above $DF_5GS$ 510.

Figure 5B:
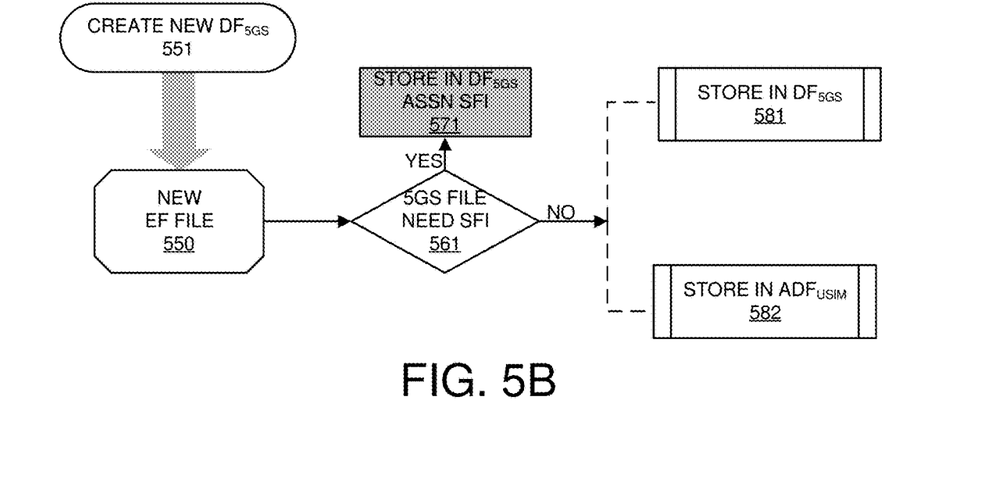
FIG. 5B illustrates exemplary diagrams for new generation-dedicated EF files under USIM ADF based on specifics of each EF in accordance with embodiments of the current invention.

As seen, there are different alternatives to assign the new EFs once the new $DF_5GS$ 510 is created. Further, for the future generation system, new EFs are to be added. In one embodiment, these future files can be put under $DF_5GS$ 510. In another embodiment, a new DF, such as $DF_{6G}$ will be created. In one embodiment, each generation of the wireless system would have its own dedicated DF. FIG. 5B further details methods of assigning the new EFs with the newly created $DF_5GS$ 510.

FIG. 5B illustrates exemplary diagrams for new files under USIM ADF based on specifics of each EF in accordance with embodiments of the current invention. In one novel aspect, a new DF, $DF_{5\_GS}$ is created for new EFs. At step 551, the new $DF_{5\_GS}$ is created. At step 550, new EF files are to be added to the USIM ADF. At step 561, the file is checked to determine whether this file needs SFI. With SFI, the file can be accessed more efficiently. If 561 determines yes, the new EF is stored in $DF_{5\_GS}$ and assigned the SFI when available. If step 561 determines that the EF is non-dedicated and does not need SFI, there are alternative ways to store the EFs. At step 581, the EF is stored in $DF_{5\_GS}$ without SFI. In one embodiment, all the 5GS files are stored in $DF_{5\_GS}$ and $DF_{5\_GS}$ includes 5GS only files. In another embodiment, all 5GS files are stored in $DF_{5\_GS}$ and $DF_{5\_GS}$ includes 5GS EFs as well as non-5GS files.

In another alternative, at 582, the non-dedicated new EF is stored under $ADF_{USIM}$. In one embodiment, a new DF dedicated to the new EFs for each new generation is created, instead of keeping adding EFs at USIM ADF level. Each DF only stores the EFs used by its corresponding network system. It solves the insufficiency of FIDs and SFIs faced by 5G files currently as well as the newer generations in the long-term future. This embodiment applies to 5GS and beyond. In one embodiment, the determination of the new EF being dedicated or non-dedicated is based on the usage of the EF.

In another novel aspect, once the DF for the new generation, such as $DF_{5\ GS}$ and the one or more EFs under it are created, the ME is allowed to access these EFs via UICC command taking advantage of SFI for the EFs with SFI value assigned. For example, 5GS 3GPP location information, 5GS non-3GPP location information, 5GS 3GPP access NAS security context, 5GS non-3GPP access NAS security context, and 5G authentication keys are each assigned a corresponding SFI.

| File Identification | SFI | Description |
| --- | --- | --- |
| '4F01' | '01' | 5GS 3GPP location information |
| '4F02' | '02' | 5GS non-3GPP location information |
| '4F03' | '03' | 5GS 3GPP access NAS security context |
| '4F04' | '04' | 5GS non-3GPP access NAS security context |
| '4F05' | '05' | 5G authentication keys |

Figure 6A:
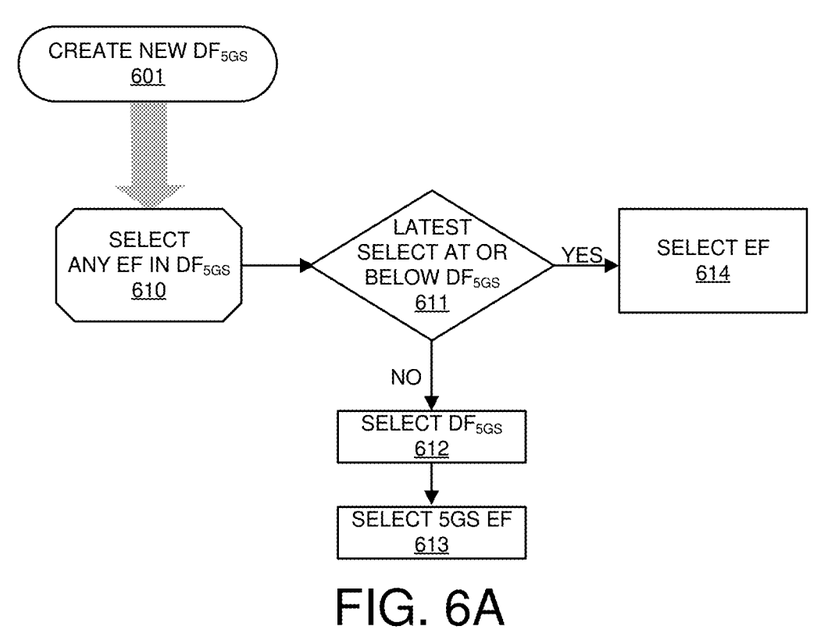
FIG. 6A illustrates an exemplary diagram for the ME SELECT operation taking advantage of SFI for the new EFs with newly created dedicated DF in accordance with embodiments of the current invention.

FIG. 6A illustrates an exemplary diagram for the ME SELECT operation taking advantage of SFI for the new EFs with newly created dedicated DF in accordance with embodiments of the current invention. At step 601, new $DF_{5\ GS}$ is created and 5GS EFs with corresponding SFIs are stored under the newly created $DF_{5\ GS}$. The $DF_{5\ GS}$ and 5GS EF are normally created by the UICC vendor. At step 610, the ME performs SELECT any EF. At step 611, the ME determines if the latest SELECT is at or below $DF_{5\ GS}$. If step 611 determines no, the ME, at step 612 performs SELECT $DF_{5\ GS}$. At step 613, the ME performs SELECT the 5GS EF. If step 611 determines yes that the latest SELECT is at or below $DF_{5\ GS}$, the ME at step 614, performs SELECT the 5GS EF.

Figure 6B:
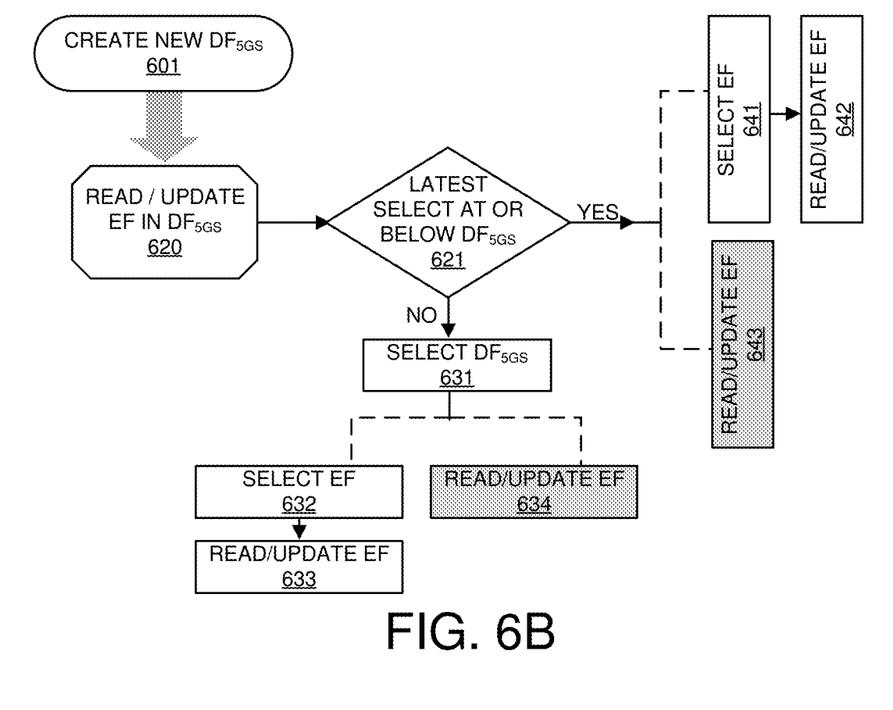
FIG. 6B illustrates an exemplary diagram for the ME READ/UPDATE operations taking advantage of SFI for the new EFs with newly created dedicated DF in accordance with embodiments of the current invention.

FIG. 6B illustrates an exemplary diagram for the ME READ/UPDATE operations taking advantage of SFI for the new EFs with newly created DF in accordance with embodiments of the current invention. At step 601, new $DF_{5\ GS}$ is created and 5GS EFs with SFI are stored under the newly created $DF_{5\ GS}$. At step 620, performs SELECT any EF. At step 621, the ME determines if the latest SELECT is at or below $DF_{5\ GS}$. If step 621 determines no, the ME, at step 631, the ME performs SELECT $DF_{5\ GS}$. Once 631 performs the SELECT, the ME has alternatives to perform the READ/UPDATE. In one embodiment, if the 5GS EF is not assigned with SFI, the ME, at step 632, SELECT the 5GS EF. At step 633, the ME READ/UPDATE the 5GS EF. Alternatively, if the 5GS EF is assigned with SFI, at step 634, the ME READ/UPDATE the 5GS EF using SFI without performing the SELECT EF. It improves the efficiency of the USIM operation. If step 611 determines yes that the latest SELECT is at or below $DF_{5\ GS}$, the ME at step 614, performs SELECT the 5GS EF. The ME has alternatives to perform the READ/UPDATE. In one embodiment, if the 5GS EF is not assigned with SFI, the ME, at step 641, SELECT the 5GS EF. At step 642, the ME READ/UPDATE the 5GS EF. Alternatively, if the 5GS EF is assigned with SFI, at step 643, the ME READ/UPDATE the 5GS EF without performing the SELECT 5GS EF. It improves the efficiency of the USIM operation.

This specification uses 5GS and/or 6G as examples for the generation DF and generation-dedicated EF. It is understood by one of ordinary skills in the art that other generation wireless standards, which are 5GS and beyond are equally applicable. The generation-dedicated EF does not include before-5GS wireless standards files, such as 2G, 3G and LTE EFs. Further, methods, steps and structures apply to UICC when applicable.

Figure 7:
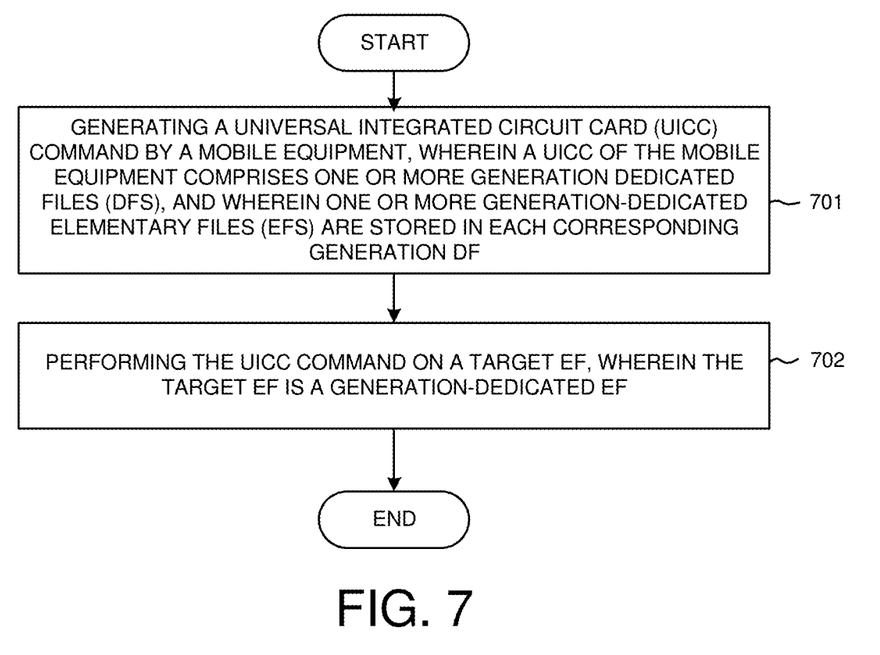
FIG. 7 illustrates an exemplary flow chart for ME performing UICC command procedures with newly created DF for new EFs in accordance with embodiments of the current invention.

FIG. 7 illustrates an exemplary flow chart for UICC command procedures with newly created DF for new EFs in accordance with embodiments of the current invention. At step 701, the UE/mobile equipment generates a UICC command, wherein a UICC of the mobile equipment comprises one or more generation DFs, and wherein one or more generation-dedicated EFs are stored in each corresponding generation DF. At step 702, the UE performs the UICC command on a target EF, wherein the target EF is a generation-dedicated EF.

Figure 8:
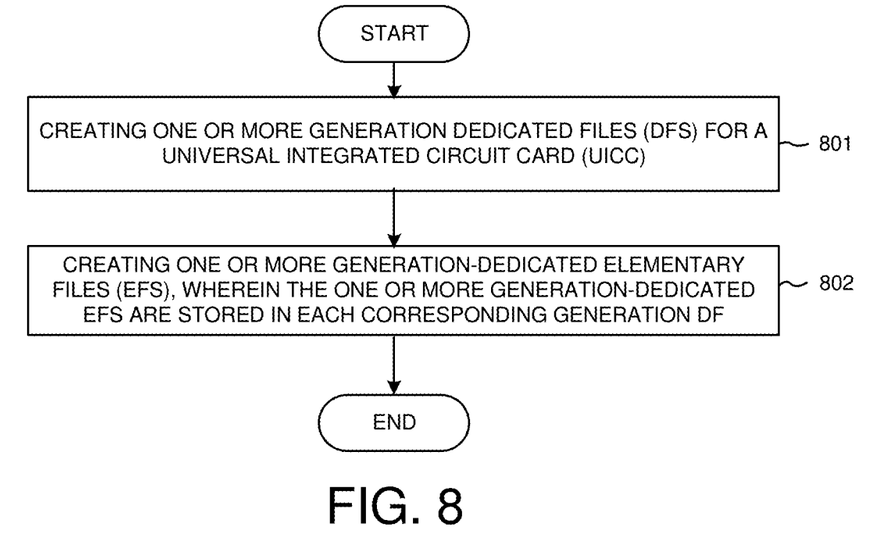
FIG. 8 illustrates an exemplary flow chart UICC operation for USIM ADF with newly created DF for new EFs in accordance with embodiments of the current invention.

FIG. 8 illustrates an exemplary flow chart for the UICC operation for USIM ADF with newly created DF for new EFs in accordance with embodiments of the current invention. At step 801, one or more generation-dedicated dedicated files (DFs) are created for a universal integrated circuit card (UICC). At step 802, one or more generation-dedicated EFs are created wherein the one or more generation-dedicated EFs are stored in each corresponding generation DF.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A user equipment (UE), comprising:
   a radio frequency (RF) transceiver;
   a memory;
   a processor coupled to the memory; and
   a universal integrated circuit card (UICC) coupled with the processor, wherein the UICC comprises:
   one or more generation dedicated files (DFs), wherein one or more generation-dedicated elementary files (EFs) are stored in each corresponding generation dedicated DF, and wherein one of the generation-dedicated EFs is a 5GS EF with a short file identifier (SFI); and
   a universal SIM (USIM) application dedicated file (ADF), wherein at least one generation dedicated DF is a 5GS DF where the 5GS EF with the SFI is stored in, and the 5GS DF is a child directory of the USIM ADF.

2. The UE of claim 1, wherein the generation dedicated DFs includes a 5GS DF where one or more 5GS EFs are stored in the 5GS DF, and wherein the one or more 5GS EF includes the 5GS EF with the SFI.

3. The UE of claim 2, wherein each of the one or more 5GS EFs is assigned a SFI.

4. The UE of claim 2, wherein the 5GS DF only includes 5GS EFs.

5. The UE of claim 1, wherein at least one of the 5GS EFs is associated with 5GS 3GPP location information.

6. The UE of claim 1, wherein at least one of the 5GS EFs is associated with 5GS non-3GPP location information.

7. The UE of claim 1, wherein at least one of the 5GS EFs is associated with 5GS 3GPP Access NAS Security Context.

8. The UE of claim 1, wherein at least one of the 5GS EFs is associated with non-5GS 3GPP Access NAS Security Context.

9. The UE of claim 1, wherein at least one of the 5GS EFs is associated with 5G authentication keys.

10. A method, comprising:
generating a universal integrated circuit card (UICC) command by a mobile equipment, wherein a UICC of the mobile equipment comprises:
one or more generation dedicated files (DFs), and wherein one or more generation-dedicated elementary files (EFs) are stored in each corresponding generation DF, and wherein at least one of the generation-dedicated EFs includes a 5GS EF with a short file identifier (SFI); and
a universal SIM (USIM) application dedicated file (ADF), wherein at least one of the generation dedicated DFs is a 5GS DF where the 5GS EF with the SFI is stored in, and the 5GS DF is a child directory of the USIM ADF; and
performing the UICC command on a target EF, wherein the target EF is a generation-dedicated EF.

11. The method of claim 10, wherein the generation dedicated DFs includes a 5GS DF, where one or more 5GS EFs are stored in the 5GS DF, and wherein the one or more 5GS EF includes the 5GS EF with the SFI.

12. The method of claim 11, wherein each of the one or more 5GS EFs is assigned an SFI.

13. The method of claim 11, wherein the 5GS DF only includes 5GS EFs.

14. The method of claim 10, wherein at least one of the 5GS EFs is associated with an element in a 5GS group comprising: 5GS 3GPP location information, 5GS non-3GPP location information, 5GS 3GPP Access NAS Security Context, non-5GS 3GPP Access NAS Security Context, and 5G authentication keys.

15. The method of claim 10, wherein the UICC further comprising: a universal SIM (USIM) application dedicated file (ADF) in which backwards compatible operation files are stored, and wherein the one or more generation DF includes a 5GS DF where the 5GS EF with the SFI is stored in, and the 5GS DF is a child directory of the USIM ADF.

16. A method, comprising:
creating one or more generation dedicated files (DFs) for a universal integrated circuit card (UICC);
creating one or more generation-dedicated elementary files (EFs), wherein the one or more generation-dedicated EFs are stored in each corresponding generation DF, and wherein one of the generation-dedicated EFs includes a 5GS EF with a short file identifier (SFI); and
creating a universal SIM (USIM) application dedicated file (ADF), wherein at least one generation dedicated DF is a 5GS DF where the 5GS EF with the SFI is stored in, and the 5GS DF is a child directory of the USIM ADF.

17. The method of claim 16, wherein the generation dedicated DFs includes a 5GS DF, where one or more 5GS EFs are stored in the 5GS DF, and wherein the one or more 5GS EF includes the 5GS EF with the SFI.

18. The method of claim 17, wherein the 5GS DF only includes 5GS only EFs.

* * * * *